United States Patent [19]
Takemoto

[11] Patent Number: 5,419,608
[45] Date of Patent: May 30, 1995

[54] AUTOMOBILE HAVING WINGS

[75] Inventor: Takatoshi Takemoto, Tokyo, Japan

[73] Assignee: Kabushiki Kaisha Ace Denken, Tokyo, Japan

[21] Appl. No.: 106,954

[22] Filed: Aug. 17, 1993

[30] Foreign Application Priority Data

Dec. 7, 1992 [JP] Japan .................. 4-326437

[51] Int. Cl.⁶ .............................................. B62D 35/00
[52] U.S. Cl. ................... 296/180.1; 180/903
[58] Field of Search ....................... 296/180.1; 180/903

[56] References Cited

U.S. PATENT DOCUMENTS

| 1,923,349 | 8/1933 | Wolverton ....................... 296/180.1 |
| 2,036,560 | 4/1936 | Backus ............................ 296/180.1 |
| 4,386,801 | 6/1983 | Chapman et al. ............ 296/180.1 X |
| 4,460,055 | 7/1984 | Steiner ....................... 296/180.1 X |
| 4,673,206 | 6/1987 | Kretschmer et al. ........... 296/180.1 |
| 4,810,021 | 3/1989 | Burst ................................ 296/180.1 |
| 5,042,870 | 8/1991 | Yura ................................ 296/180.1 |
| 5,184,832 | 2/1993 | Miwa ....................... 296/180.1 X |

FOREIGN PATENT DOCUMENTS

| 0257341 | 3/1988 | European Pat. Off. . |
| 3032074 | 4/1982 | Germany . |
| 3110991 | 5/1982 | Germany . |
| 3625814 | 2/1988 | Germany .......................... 296/180.1 |
| 560594 | 1/1959 | Italy ................................ 296/180.1 |
| 443903 | 3/1936 | United Kingdom ............. 296/180.1 |

*Primary Examiner*—Joseph Pape
*Attorney, Agent, or Firm*—Lowe, Price, LeBlanc & Becker

[57] ABSTRACT

A body is positioned above an area between front and rear wheels. Wings for generating a down force to increase the load of wheels upon the ground by an air stream flowing from the front side to the rear side are provided between the front wheels and between the rear wheels, respectively. Flow paths along which an air flows from the front side to the rear side during forward traveling to the wings are defined in and along the body.

11 Claims, 4 Drawing Sheets

AUTOMOBILE HAVING WINGS

BACKGROUND OF THE INVENTION (1) Field of the Invention

The present invention relates to an automobile, and in particular to an automobile having wings for generating a down force caused by an air stream during traveling to increase the load imposed upon the ground from wheels.

(2) Description of Related Art

A lifting force which is generated by an air stream is applied to an automobile traveling at high speed running to lift it slightly. The load imposed upon the ground from the wheels decreases so that the vehicle can easily skid and stability is reduced.

In order to avoid this problem, a wing which is also called a "spoiler" has been mounted on the front or rear side upper surface of an automobile body for increasing the vehicle stability during high speed travel. This wing acts with an air stream flowing therealong at a high speed to generate a downward force (hereinafter referred to as a down force) for increasing the load imposed upon the ground from the wheels. The wing has heretofore been mounted on the automobile body.

It has therefore been difficult to freely design the vehicle body to provide excellent appearance and/or to reduce aerodynamic resistance since freedom to design the body is limited by the wing mounting.

SUMMARY OF THE INVENTION

It is therefore an object of this invention to provide an automobile in which the body is separated from means for generating a down force and which is capable of providing a high stability during high speed travel due to a down force while the body can be freely designed.

In order to accomplish the above mentioned object, the present invention provides an automobile including two pairs of wheels which are at opposite lateral sides, one pair being disposed on each of the front and rear ends of a body, the body being disposed above an area between the wheels, and above wheels characterized in that wing means for generating a down force to increase the load imposed upon the ground from wheels by an air stream flowing from the front side to the rear side of the automobile is provided between the pair of front wheels disposed on the front side of the body and/or the pair of rear wheels disposed on the rear side of the body; and in that an air flow path for introducing air from the front side to the rear side of the body during forward travel is established in and along the body.

The wing means may be provided between the pair of front wheels and the body is formed with an air inlet for introducing air to the wing means on the front face thereof.

The wing means may be provided between the pair of rear wheels and the body is formed with an air outlet for discharging the air from the rear wing means to outside of the body.

The wing means may be provided between the pair of front wheels and between the pair of rear wheels and in which the body is formed with an air inlet for admitting air to the front wing means between the pair of front wheels on the front face thereof and is formed with an air outlet for discharging air from the rear wing means between the pair of rear wheels to outside of the body at the rear face thereof.

The pair of front wheels may be linked with each other via an axle. The axle may be housed in an axle casing and the wing means may be secured to the axle casing.

At least one of the wing means may be divided into two right and left wing parts.

The right and left wing parts may be secured to right and left wheel housings, respectively.

DESCRIPTION OF PREFERRED EMBODIMENTS

Figure 1:
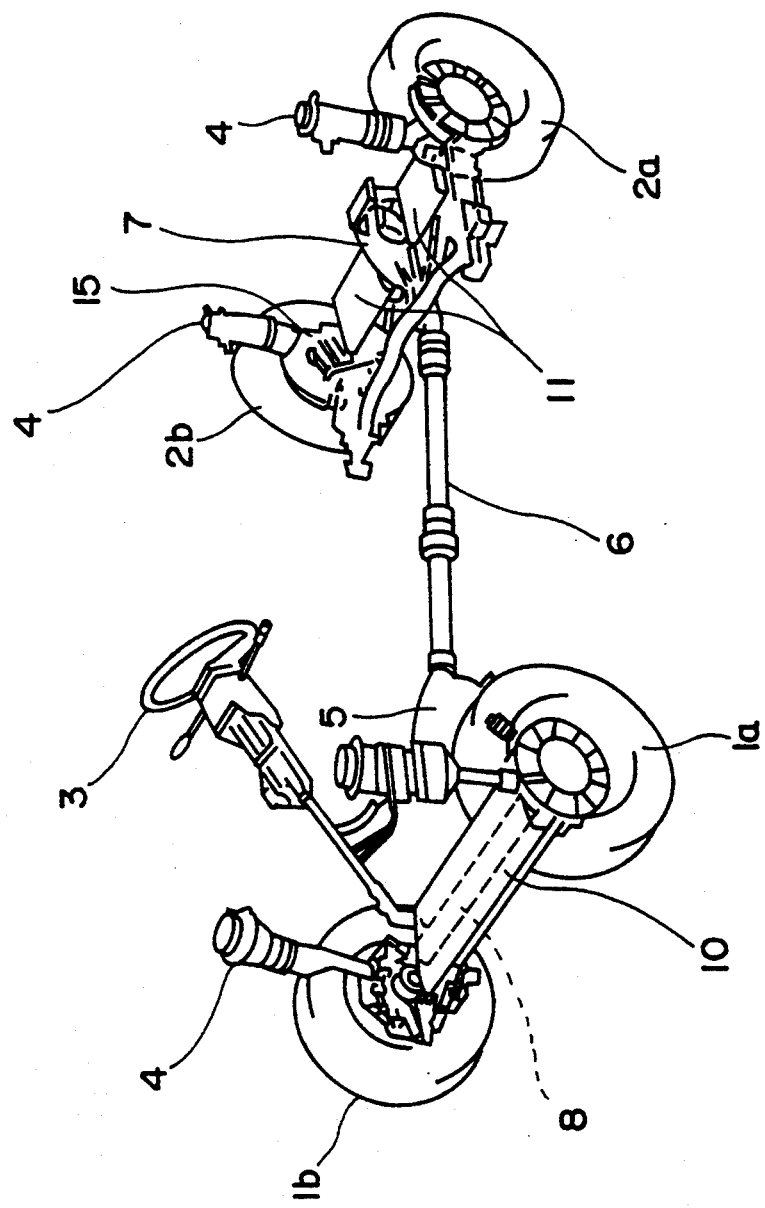
FIG. 1 is a perspective view showing an embodiment of the present invention with the body, etc. being omitted.
Figure 2:
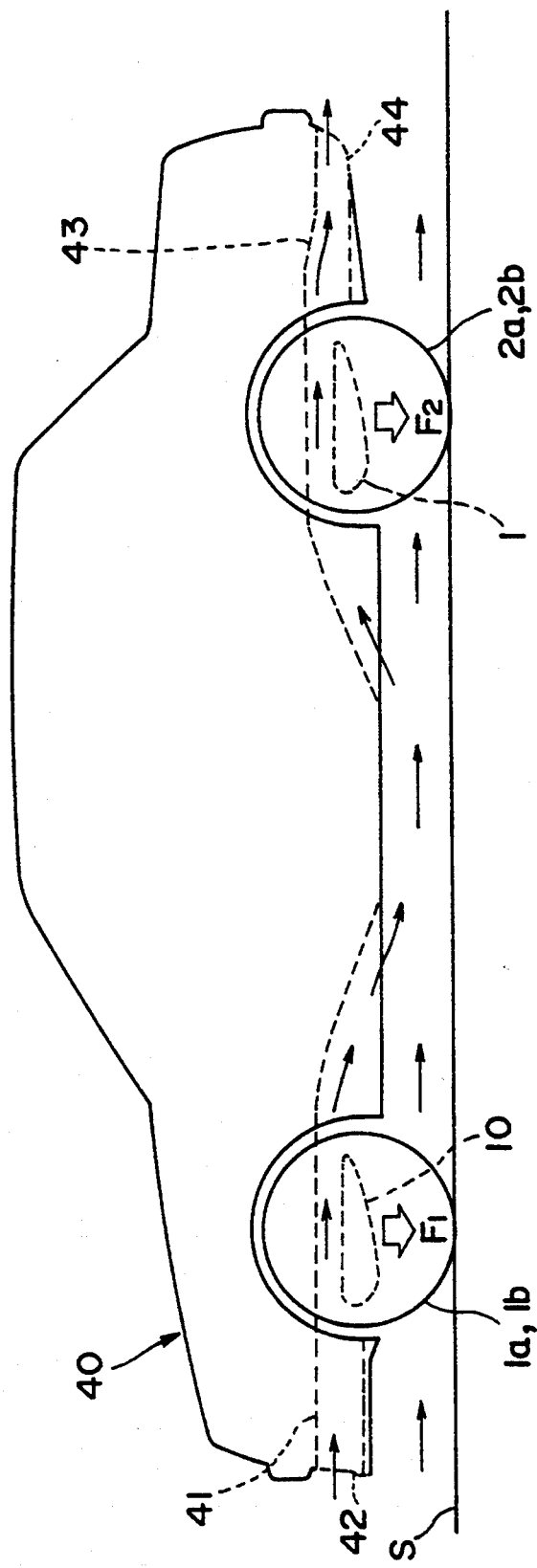
FIG. 2 is an elevational view showing an automobile which is one embodiment of the present invention.

Now, embodiments of the present invention will be described. An automobile of an embodiment includes four wheels including symmetrical right and left front wheels 1a and 1b and symmetrical right and left rear wheels 2a and 2b which are disposed on the front and rear ends of a body 40, respectively, as shown in FIGS. 1 and 2. The automobile further includes a steering wheel 3, suspensions 4, one for each of the wheels, a transmission 5, a propeller shaft 6, a differential gear 7, an engine (not shown) and a steering system (not shown). The engine and the steering system, etc. are disposed in the body 40.

Figure 3:
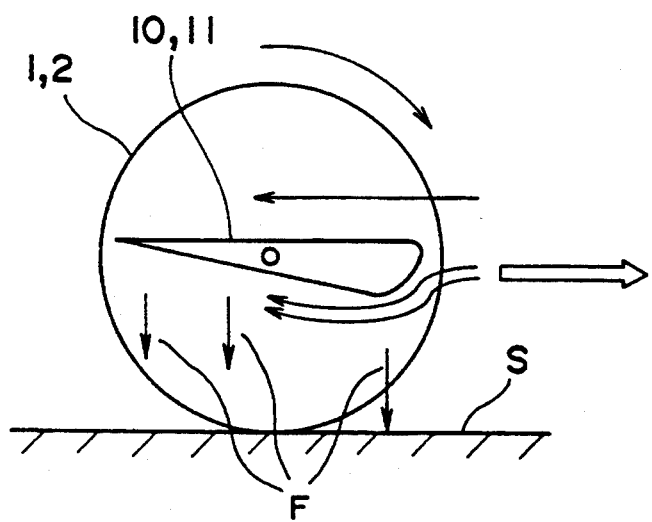
FIG. 3 is an elevational view showing the operation of wings in one embodiment of the present invention.
Figure 4:
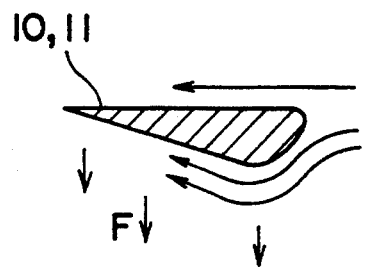
FIG. 4 is a sectional view showing the operation of a wing in one embodiment of the present invention.

The body 40 is disposed above the area between the front and rear wheels 1a, 1b and 2a, 2b, and above these wheels. Front and rear wings 10 and 11, respectively are provided between the front wheels 1a and 1b and between the rear wheels 2a and 2b, respectively. The wings 10, 11 have cross sections each having a convex underside in accordance wing principles as shown in FIGS. 3 and 4 so that a down force F is generated due to an air stream during forward travel of the automobile.

The front wing 10 is secured to a front axle casing 8. The rear wing 11 is divided into right and left wings, which are secured to right and left wheel housings 15 in a cantilever manner.

Flow paths 41 and 43 for admitting air to the wings 10 are provided in the body 40 as shown in FIG. 2. The body 40 is formed with an air inlet 42 and an air outlet 44 on the front and rear faces thereof, respectively to provide these flow paths 41 and 43. The air inlet 42 on the front face of the body 40 is provided mainly for the front wing 10. A portion of the underside (not shown) which forms part of the body 40 in front of the rear wheels 2a and 2b is deformed to create an opening for introducing the air to the rear wing 11. The air discharge outlet 44 on the rear face of the body 40 is provided mainly for the rear wing 11. Part of the undercover which is located at the rear of the front wheels 1a and 1b is deformed to cause the air which has passed through the front wing 10 to flow towards the rear.

Operation of the automobile of the present embodiment will now be described.

When the automobile travels forward, air which flows from the front side to the rear side of the automobile is introduced to each of the wings 10 and 11. The down force F which is generated due to such an air flow is applied to each of the wings 10 and 11 as shown in FIGS. 3 and 4. Accordingly, this down force F is then applied to each of the wheels 1a, 1b, 2a and 2b in addition to the load such as vehicle weight.

Load which is applied from the wheels 1a, 1b, 2a, 2b to the road surface S increases and no slip occurs. A driving torque imposed upon the wheels 1a, 1b, 2a, 2b can be transmitted to the road surface without any loss so that stable travel is possible.

Figure 6:
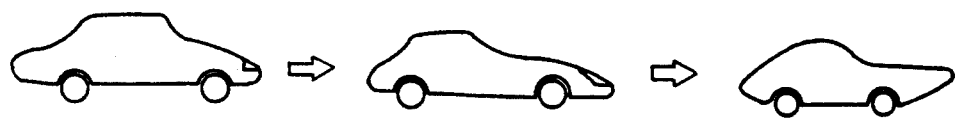
FIG. 6 shows various body designs which are made in accordance with the present invention.
Figure 7:
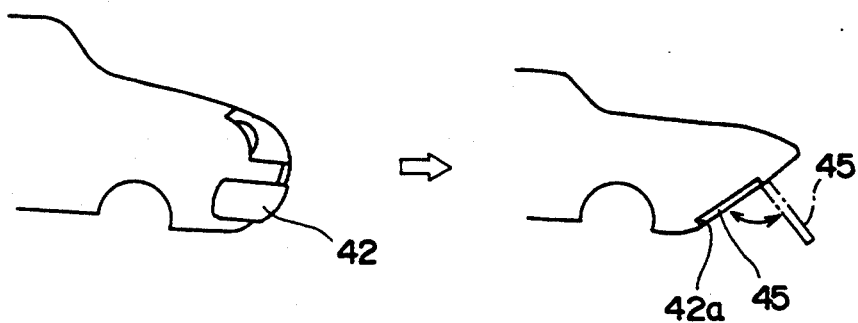
FIG. 7 shows various body designs which are freely made in accordance with the present invention.
Figure 8:
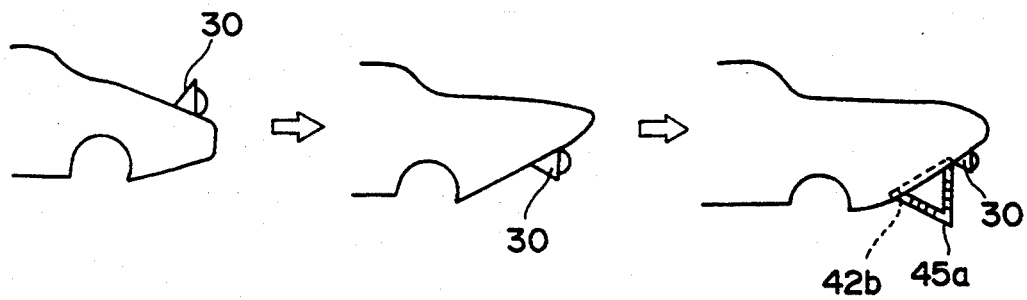
FIG. 8 shows various body designs which are made in accordance with the present invention.

Since the wings 10, 11 are provided between the wheels which are disposed below the body 40, the body configuration can be freely designed without any restriction due to mounting of the wings while the effect of the wings is obtained. Various body configurations can be designed to provide excellent appearance and/or to reduce aerodynamic resistance as shown in FIGS. 6 and 7. Various manners of mounting of a light can be designed as shown in FIG. 8. Air inlets which are represented by reference numerals 42, 42a, 42b in FIGS. 7 and 8 are provided to efficiently introduce the air and are normally opened. Lids which are represented by reference numerals 45, 45a are mounted on air inlet 42a, 42b having the same functions as those of the air inlets 42, 42a, 42b.

Figure 5:
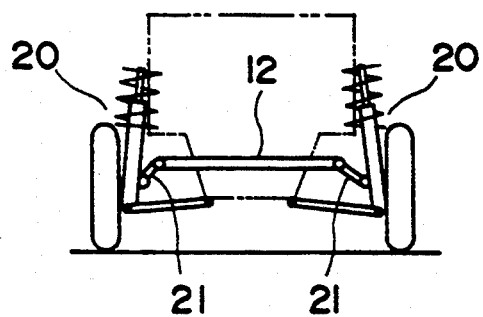
FIG. 5 is a front view showing another mounting of one wing in accordance with the present invention.

It is to be noted that the manner of mounting of the wings is not limited to only the present embodiment and that it is preferably changed depending upon the suspension structure. For example, if the suspensions are of axle type, it is appropriate to secure the suspensions to the axle casing 8 similarly to the front wing 10 of the above mentioned embodiment. If the suspensions are of independent suspension type, nothing is relevant to the axle and right and left suspensions independently work. Accordingly, the manner of mounting should be changed. In the case of such independent suspension, the wing 12 is preferably mounted on part of the right and left suspensions (strut type) 20 or axle via links 21 as shown in FIG. 5.

If the right and left suspensions 20 independently move, the links 20 absorb these movements to normally maintain the wing 12 in parallel relationship with right and left axles. In the case of independent suspension, the front wings 10 may be divided into two wings, which are in turn secured to the right and left wheel housings 15 similarly to the rear wing 11 of the above mentioned embodiment.

Since the flow paths for introducing air to the wings 10 and 11 largely vary depending upon the shape of the suspension, the arrangement of the engine and/or presence or absence of the undercover, it can not be specified herein. In the case there is no underside, the flow paths can be substantially provided relative to the body by arranging the parts in such a manner that they will not obstruct the flow path even if there is no member for forming the flow path.

Although the wings 10, 11 are provided between the front and rear wheels 1a and 1b; 2a and 2b respectively in the foregoing embodiment, the wing may be disposed only between the front wheels 1a and 1b or between the rear wheels 2a and 2b.

What is claimed is:

1. An automobile comprising a body having a front end and a rear end, two pairs of wheels which impose a load on the ground, one of the pairs of wheels disposed proximate the front end of the body and the other pair of wheels disposed proximate the rear end of the body, a suspension mechanism for supporting said wheels so that said wheels may move vertically with respect to said body relatively, said suspension mechanism having a wheel connecting member secured to said wheels so that its relative position with respect to the wheel may not change, a body connecting member secured to said body so that its relative position with respect to said body may not change, a spring member for connecting said wheel connecting member and said body connecting member so that the vertical movement of said wheel and said wheel connecting member with respect to said body and said body connecting member may be absorbed, inlet means on the front end of the automobile body for introducing an air stream in an air flow path to the rear end of the automobile during forward movement, wing means for generating a downward force to increase the load imposed upon the ground from the wheels by the air stream, wherein the wing means which is secured to said wheel connecting member of said suspension mechanism for the pair of wheels is provided between the pair of front wheels and/or the pair of rear wheels.

2. An automobile according to claim 1 in which the wing means is provided between the pair of front wheels and the body is formed with an air inlet for introducing air to the wing means on the front end thereof.

3. An automobile according to claim 1 in which the wing means is provided between the pair of rear wheels and the body is formed with an air outlet for discharging the air from the rear wing means to outside of the body.

4. An automobile according to claim 1 in which the wing means are provided between the pair of front wheels and between the pair of rear wheels and in which the body is formed with an air inlet for admitting air to said front wing means between the pair of front wheels on the front end thereof and is formed with an air outlet for discharging air from the rear wing means between the pair of rear wheels to outside of the body at the rear end thereof.

5. An automobile according to claim 1 in which the pair of front wheels are linked with each other via an axle, the axle housed in an axle casing composing said wheel connecting member, and the wing means secured to the axle casing.

6. An automobile according to claim 1 in which at least one of the wing means is divided into a right wing part and a left wing part.

7. An automobile according to claim 6 in which the right and left wing parts are secured to right and left wheel housings, respectively.

8. An automobile according to claim 1 comprising an air outlet in the flow path between the front and rear pairs of wheels.

9. An automobile according to claim 1 comprising an air inlet in the flow path between the front and rear pair of wheels.

10. An automobile according to claim 8 comprising an air inlet in the flow path between the front and rear pairs of wheels.

11. An automobile according to claim 1 wherein each wing means is confined within a cylindrical space defined by the wheels between which it is provided.

* * * * *